United States Patent [19]
Hellman, Jr.

[11] Patent Number: 5,984,442
[45] Date of Patent: *Nov. 16, 1999

[54] CABINET AND SLIDING DRAWER HAVING IMPROVED FEATURES

[75] Inventor: Robert R. Hellman, Jr., Oxford, Conn.

[73] Assignee: The Durham Manufacturing Company, Durham, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,314

[22] Filed: May 7, 1997

[51] Int. Cl.$^6$ .................................................. A47B 88/00
[52] U.S. Cl. ...................... 312/334.12; 312/333; 312/350
[58] Field of Search ............................ 312/334.12, 333, 312/330.1, 334.1, 334.7, 334.8, 334.18, 334.19, 350, 334.41, 334.14; 385/19

[56] References Cited

U.S. PATENT DOCUMENTS

| | | | |
|---|---|---|---|
| 686,777 | 11/1901 | Snook | 312/334.12 |
| 763,492 | 6/1904 | Laakso | 312/334.41 |
| 1,910,208 | 5/1933 | Gronberg et al. | . |
| 2,212,191 | 8/1940 | Dietz | 312/334.18 |
| 2,562,632 | 7/1951 | Mosman | 312/334.19 X |
| 2,566,186 | 8/1951 | Gillett | 312/323 |
| 2,769,551 | 11/1956 | Just | 312/333 X |
| 2,859,070 | 11/1958 | Gomersall | . |
| 2,880,040 | 3/1959 | Gomersall | . |
| 2,961,284 | 11/1960 | Sturm | 312/350 |
| 3,061,395 | 10/1962 | Marateck et al. | 312/350 X |
| 3,471,209 | 10/1969 | Howard | 312/333 X |
| 3,539,240 | 11/1970 | Lorenzo | 312/333 |
| 3,877,768 | 4/1975 | Novak et al. | 312/350 X |
| 3,954,315 | 5/1976 | Sanden | 312/333 |
| 3,973,814 | 8/1976 | Entrikin | 312/333 |
| 4,615,095 | 10/1986 | Bessinger et al. | 312/333 X |
| 4,983,000 | 1/1991 | Rock | 312/333 |
| 5,470,144 | 11/1995 | Wen | 312/334.12 X |
| 5,520,452 | 5/1996 | Petersen et al. | 312/334.12 |
| 5,634,703 | 6/1997 | Vonier | 312/333 X |

*Primary Examiner*—Peter M. Cuomo
*Assistant Examiner*—James O. Hansen
*Attorney, Agent, or Firm*—John H. Crozier

[57] ABSTRACT

A a cabinet with a sliding drawer, including: a housing; two opposing outer slides attached to inner surfaces of opposite sides of the housing; two inner slides attached to the sliding drawer and disposed in and telescopingly engaging the outer slides; and two first rollers contacting the inner slides and having their axes attached to the sides of the housing, with the axes of the first rollers spaced below a lower edge of the outer slide. Further, a cabinet with a sliding drawer, including: a housing having opposite side panels and front and rear ends; two opposing slide mechanisms attached to inner surfaces of the side panels and to sides of the sliding drawer; and the slide mechanisms being downwardly sloped from the front end of the housing toward the rear of the housing a degree sufficient to compensate for sagging from horizontal the sliding drawer may experience when extended from the housing.

3 Claims, 8 Drawing Sheets

CABINET AND SLIDING DRAWER HAVING IMPROVED FEATURES

BACKGROUND OF THE INVENTION

1. Field of the Invention

The present invention relates to cabinets generally and, more particularly, but not by way of limitation, to novel cabinet and sliding drawer with improved roller construction, improved manufacturability, and a drawer that remains essentially horizontal when fully extended from the cabinet.

2. Background Art

Cabinets with one or more drawers are universally used for the storage and ready accessibility of a wide variety of materials, small parts and business papers being common examples of such materials.

Some such cabinets and drawers are constructed with telescoping two- or three-piece drawer slides, with one of the slides being attached to the drawer and another of the slides being attached to the inside of the cabinet, such a drawer slide assembly being employed on either side of the drawer. In may cases, the slides have one or more wheels, or rollers, disposed between adjacent ones of the slides, the roller(s) being mounted inside the smaller of the slides. This greatly reduces the sliding friction between the slides, but the diameter of the roller is necessarily limited and, therefore, the reduction in sliding friction is limited to the capabilities of a roller having a given diameter. The width of the slides in which the rollers are mounted is somewhat narrow, leading to instability and the tendency for the roller and its corresponding slide to become disengaged.

Cabinet drawer slides are typically horizontally attached to the drawer and to the inside of the cabinet. This arrangement results in the outer end of the drawer dropping somewhat downwardly when the drawer is fully or nearly fully withdrawn from the cabinet, due to the weight of the drawer and because the slides have a certain amount of "play" therebetween as a result of wear or intentional design clearances, the latter being required so that the slides move freely.

Cabinets are typically constructed of metal, with an outer housing having side, rear, top, and bottom walls formed or permanently attached together, sometimes with front rails or a front wall extending between the side walls, separate members being welded together. Slides are usually spot welded to the inside surfaces of the side walls. If an error or defect in one of the members is discovered during manufacture or at final inspection, the entire work to that point must usually be discarded.

Accordingly, it is a principal object of the present invention to provide an improved drawer slide for a cabinet in which the slide has at least one roller having a diameter which can be greater than the internal height of the smaller slide and a width which can be greater than the width of the slide in which it would conventionally be mounted.

It is a further object of the invention to provide an improved cabinet and drawer with which the drawer is substantially horizontal when fully or nearly fully withdrawn from the cabinet.

It is an additional object of the invention to provide an improved cabinet and drawer slide construction that reduces the amount of material that must be discarded due to defects.

It is another object of the invention to provide an improved cabinet in which the foregoing features are economically manufactured.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in one preferred embodiment, a cabinet with a sliding drawer, comprising: a housing; two opposing outer slides attached to inner surfaces of opposite sides of said housing; two inner slides attached to said sliding drawer and disposed in and telescopingly engaging said outer slides; and two first rollers contacting said inner slides and having their axes attached to said sides of said housing, with said axes of said first rollers spaced below a lower edge of said outer slide. In a further aspect of the invention, there is provided a cabinet with a sliding drawer, comprising: a housing having opposite side panels and front and rear ends; two opposing slide mechanisms attached to inner surfaces of said side panels and to sides of said sliding drawer; and said slide mechanisms being downwardly sloped from said front end of said housing toward said rear of said housing a degree sufficient to compensate for sagging from horizontal said sliding drawer may experience when extended from said housing. In yet another aspect of the invention, there is provided a cabinet, comprising: a generally hollow, rectilinear housing having opposite sides and top, back, and bottom walls; said side panels having rearwardly facing U-shaped channels formed along front edges thereof; inner side panels attachable to said side panels by insertion of front edges thereof into said U-shaped channels and rotating said inner panels about said U-shaped channels to parallel proximity with inner surfaces of said side panels and being removably secured in such position.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 1:
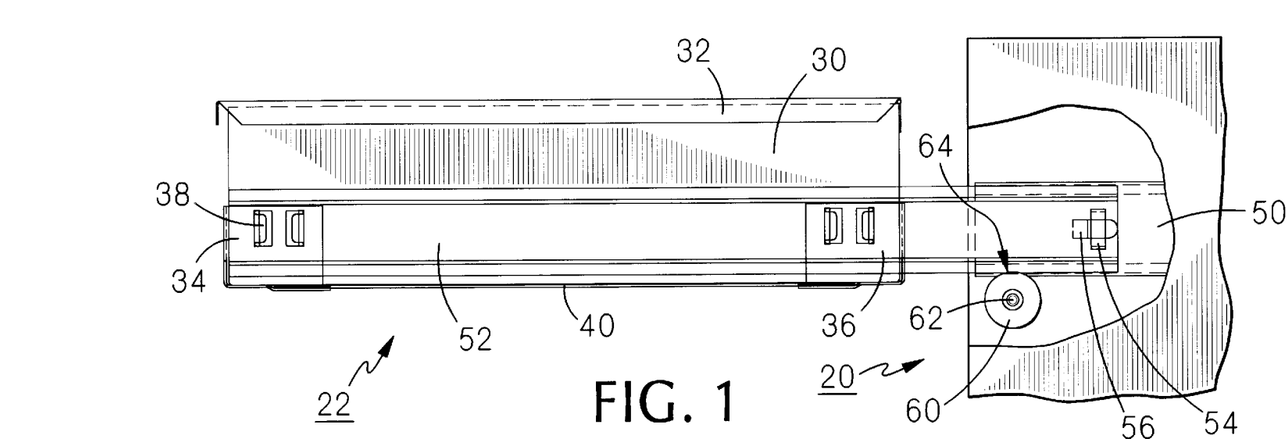
FIG. 1 is a fragmentary, side elevational view, partially cutaway, of one embodiment of a cabinet with sliding drawer, constructed according to the present invention.

FIG. 1 illustrates one embodiment of a cabinet and sliding drawer constructed according to the present invention, the cabinet being generally indicated by the reference numeral 20 and the drawer being generally indicated by the reference numeral 22. As shown, drawer 22 includes a compartment parts box 30 mounted covered with a hinged lid 32 for access to the interior of the box. Box 30 is attached to front and rear cradle members 34 and 36, respectively, by means of tabs, as at 38, the front and rear cradles being connected by a centrally disposed crossmember 40 extending therebetween and attached thereto. Cabinet 20 and drawer 22 are arranged so that box 30 may be fully withdrawn from the cabinet. It will be understood that the above is only one of a number of conventional cabinet/drawer arrangements with which the present invention may be employed.

Attached to the inner surface of cabinet 20 is a horizontal outer slide member 50 and attached to the one side of drawer 22 is an inner slide member 52. As with conventional drawer slides, inner slide 52 telescopingly engages the interior of outer slide 50. Accidental complete withdrawal of drawer 22 from cabinet 20 is prevented by the engagement of a loop 54 formed on inner slide 52 engaging a stop 56 attached to outer slide 50.

Figure 2:
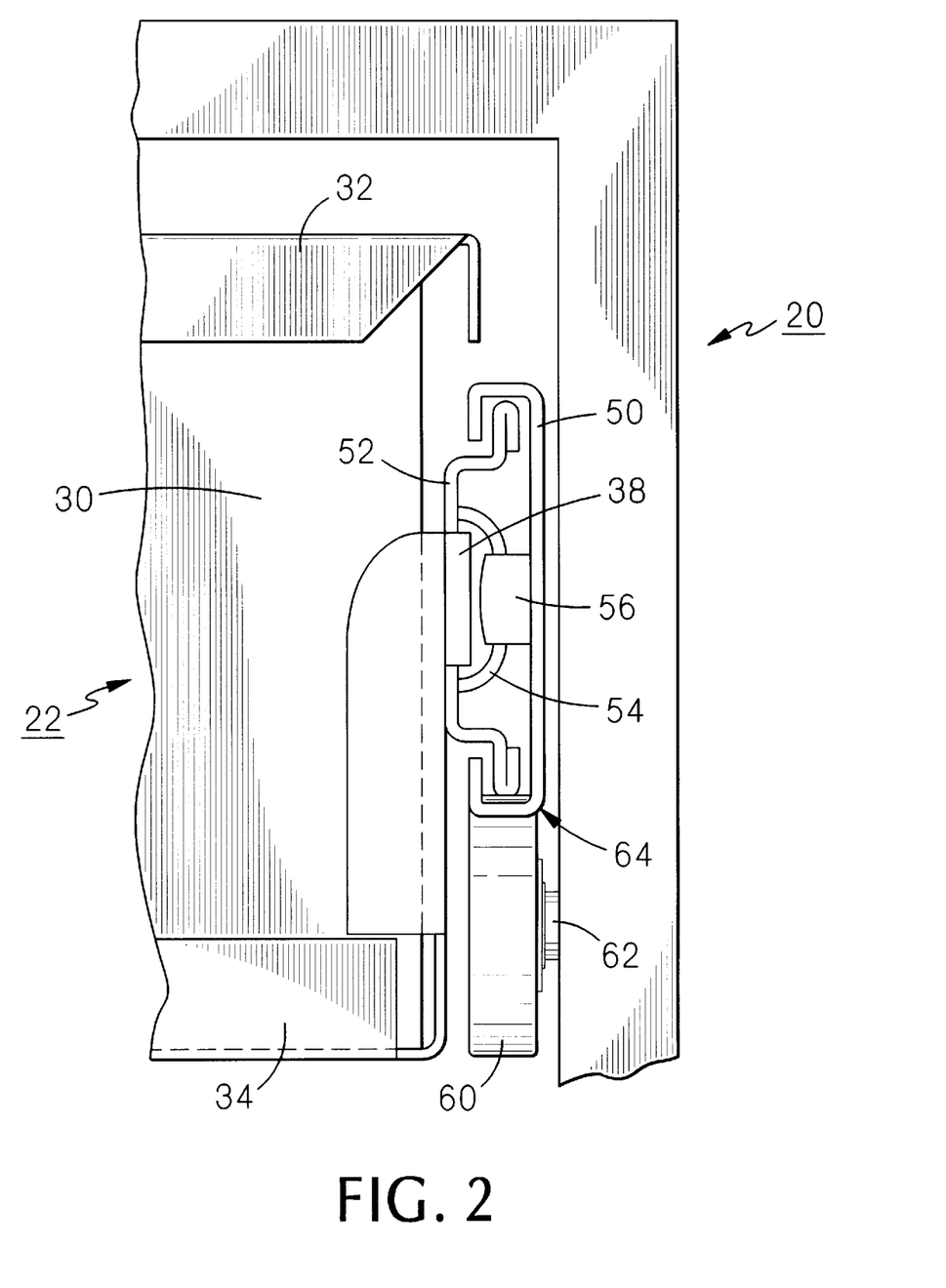
FIG. 2 is a fragmentary, front elevational view of the embodiment of FIG. 1.

In the case of the present invention, there is no roller disposed between outer and inner slides 50 and 52. Rather, the present invention provides a roller 60 engaging inner slide 52, but having its axis disposed externally to outer slide 50. Roller 60 has its axle 62 attached to the inner surface of cabinet 20 and contacts the lower edge of inner slide 52 through an opening 64 defined through the lower edge of outer slide 50. FIG. 2 more clearly illustrates aspects of this arrangement. A ball bearing (not shown) may be disposed between roller 60 and axle 62.

Figure 3:
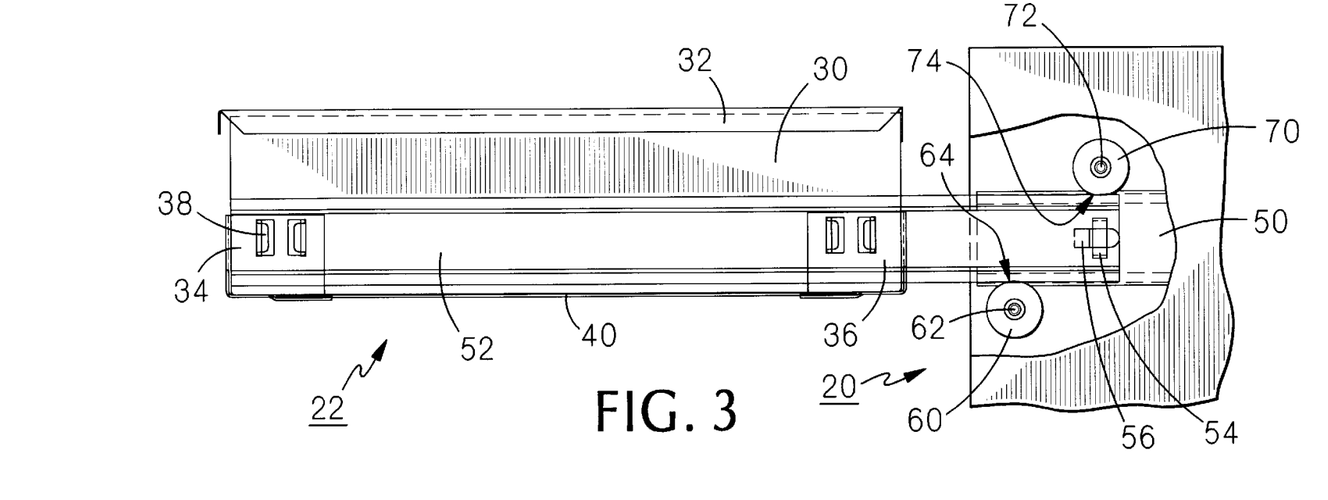
FIG. 3 is a fragmentary, side elevational view, partially cutaway, of another embodiment of a cabinet and sliding drawer, constructed according to the present invention.

FIG. 3 illustrates the elements of FIGS. 1 and 2 with the addition of a second roller 70, having its axle 72 disposed externally to outer slide 50, and contacting the upper edge of inner slide 52 through an opening 74 defined through the outer slide. Such an arrangement is particularly useful when the drawer is to contain heavy materials and, especially, when it is to be fully withdrawn as is shown on FIGS. 1 and 3. When used with two or more drawers, roller 70 can be offset rearwardly from roller 60 (as shown) to nest behind the equivalent of roller 60 (not shown) contacting an inner slide (not shown) above roller 70, in space not otherwise used.

The use of external rollers 60 (FIGS. 1 and 2) or rollers 60 and 70 (FIG. 3) offers several advantages over conventionally constructed cabinet/drawer arrangements. One of these is that wider rollers may be employed. In the typical construction, tabs 38 protrude into inner slide 52, limiting the width of a roller disposed within the inner slide. Use of external rollers 60 or 60 and 70 permits use of rollers of much larger diameters than internally disposed rollers. This permits a significantly higher O.D./I.D. ratio with inherently reduced friction. With the use of an external roller 60 or rollers 60 and 70, the rollers can be made wider, thus providing more stability while decreasing the I.D. requirement for a given load and enhancing the above ratio and reducing friction.

Figure 4:
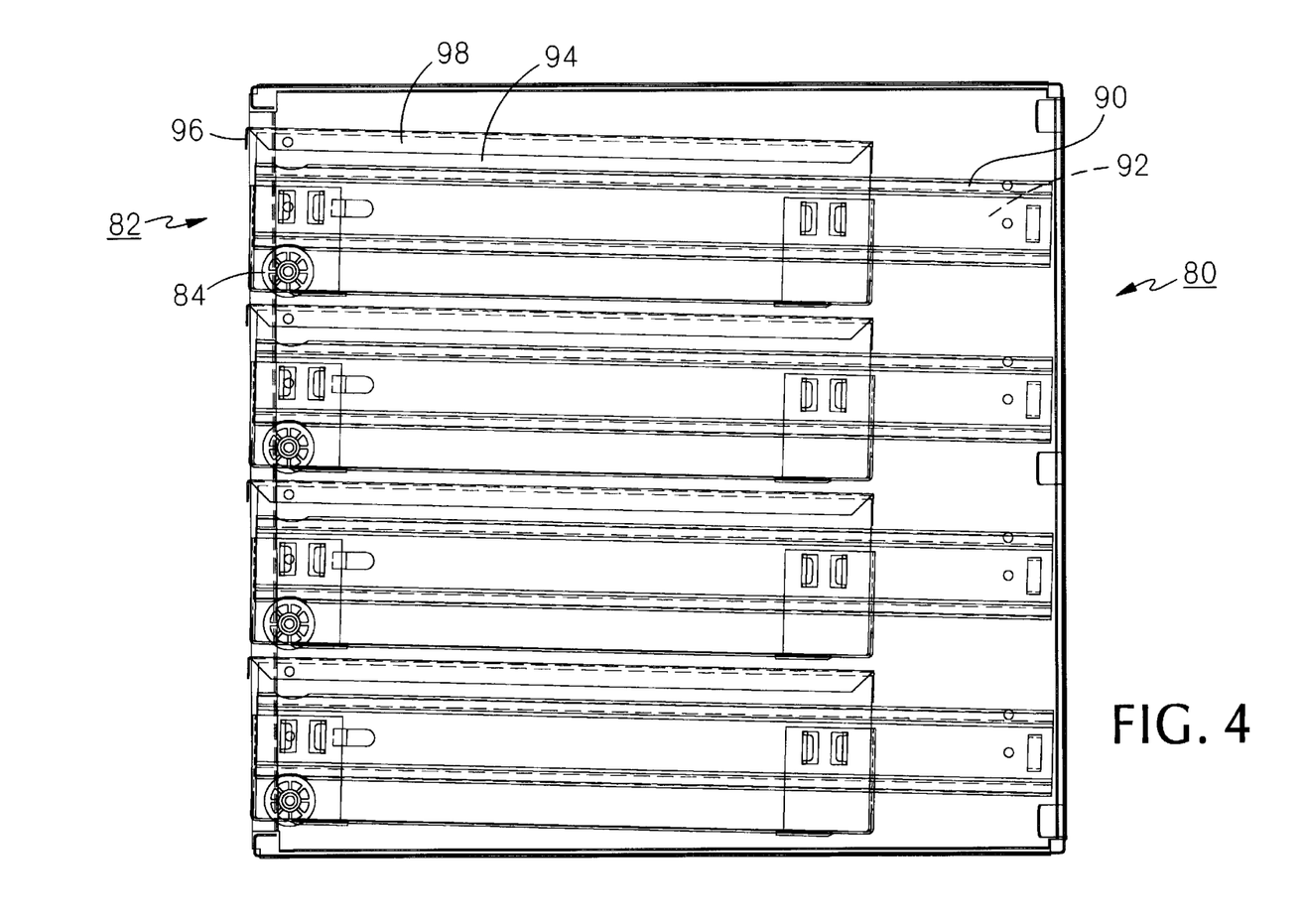
FIG. 4 is a cutaway, side elevational view of a cabinet with sliding drawers showing another aspect of the present invention.

FIG. 4 illustrates a cabinet with sliding drawers, generally indicated by the reference numeral 80, and constructed according to another aspect of the present invention.

Cabinet 80 is shown as having a plurality of drawers, as at 82, which are similar to drawer 22 (FIGS. 1–3), although it will be understood that this aspect of the invention is not so limited and the invention may be used, as well, with other types of drawers and any number of drawers, including a single drawer. Cabinet 80 is also shown as employing external rollers, as at 84, although it will be understood that the invention may be used, as well, in cabinets using no rollers or cabinets with conventional rollers disposed internally of slides.

Cabinet 80 includes a plurality of outer and inner slides 90 and 92, respectively, having the same form and function of outer and inner slides 20 and 22 (FIGS. 1–3). Again, the present invention is not limited to the types of slides shown. As can be observed from FIG. 4, slides 90 and 92 are canted such that they slope downwardly inwardly from the front of cabinet 80. The angle of cant is chosen such that, when drawer 82 is withdrawn fully or nearly fully from cabinet 80, the drawer will be essentially horizontal, the angle of cant compensating for any wear or intentional design clearances.

In the present case, the fronts of boxes 94 remain orthogonal to the major axes of the boxes, the lips 96 of the lids 98 of the boxes offsetting the canted fronts appearancewise. With drawers having greater height and/or with a cabinet with a front panel, it may be desirable to mount the fronts of the drawers at an angle so they lie in the same plane as the front of the cabinet.

FIGS. 5–9 illustrate an aspect of the present invention whereby construction of a cabinet with sliding drawers is easily performed, while minimizing the amount of defective materials that must be discarded.

Figure 5:
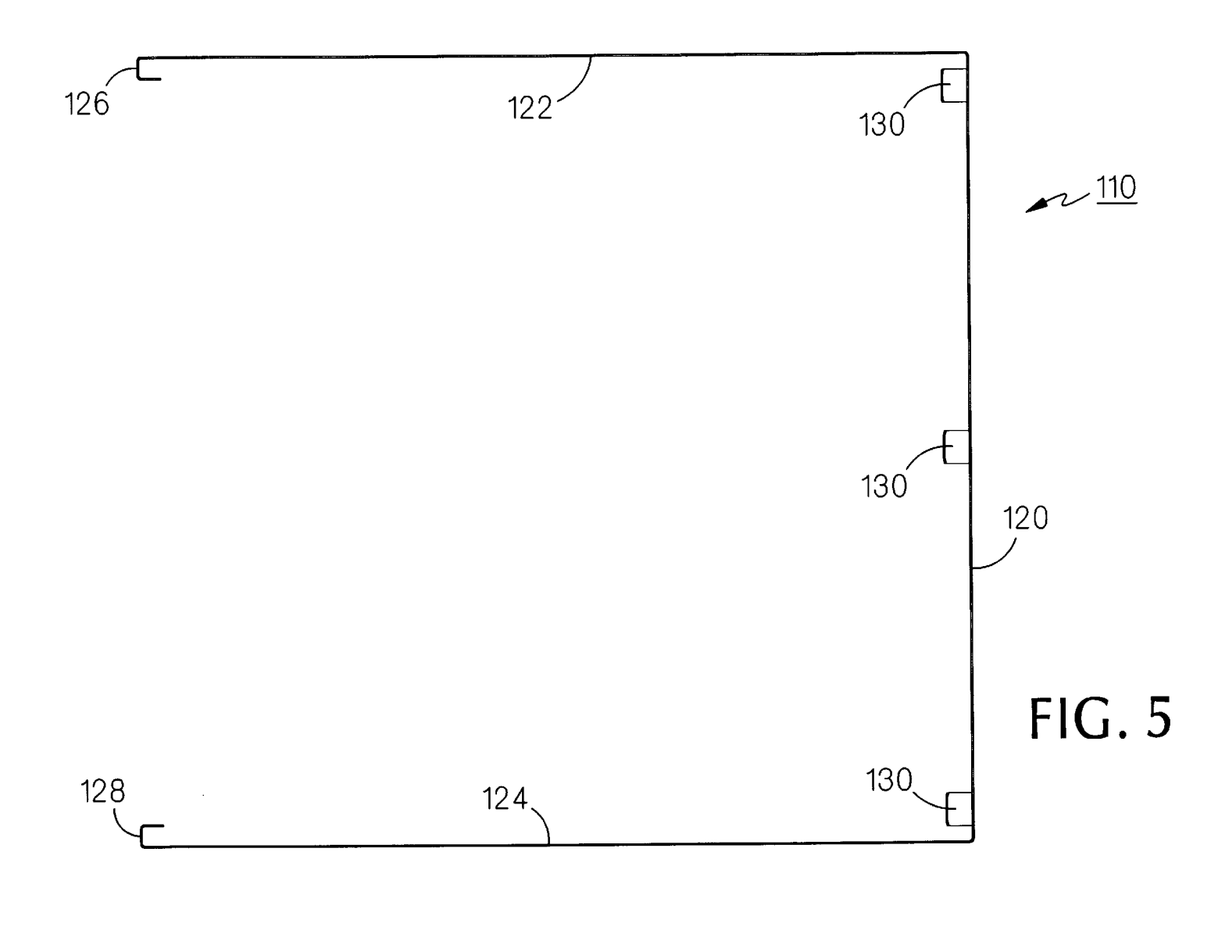
FIG. 5 is a side elevational view, in cross-section, of an external wrap for a cabinet, constructed according to one aspect of the present invention.

FIG. 5 illustrates an external wrap for a cabinet constructed according to the present invention, the wrap being generally indicated by the reference numeral 110. Wrap 110 includes a back panel 120 which will become the back panel of the cabinet and top and bottom panels 122 and 124 which will become, respectively, the top and bottom panels of the cabinet. The front edges of top and bottom panels 122 and 124 have rearwardly open U-shaped channels 126 and 128, respectively, formed therealong. It should be noted that wrap 110 is symmetrical about its central axis such that bottom panel 124 can serve as the top panel of the cabinet. This feature is advantageous when, for example, panel 122 is found to contain a visual defect that would preclude its use as a top panel for the cabinet. Wrap 110 can then be inverted 180 degrees, thus avoiding discarding the wrap. FIG. 5 also shows inwardly bent tabs 130 formed in back panel.

Figure 6:
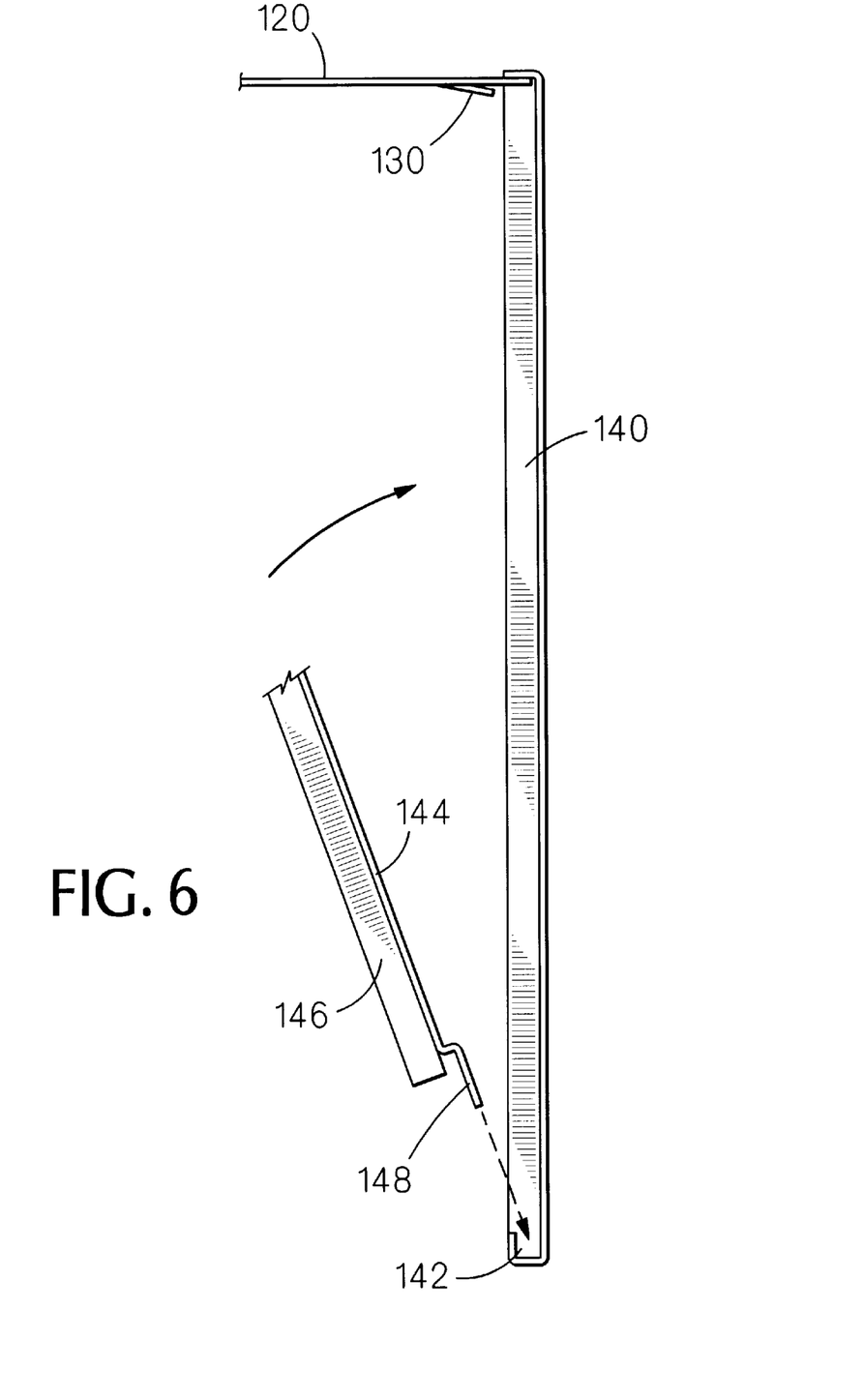
FIG. 6 is a fragmentary, top plan view showing a step in the manufacture of the cabinet.

FIG. 6 illustrates back panel 120 with a right side panel 140 spot welded to the right edge of the back panel. It will be understood that there is a left side panel (not shown on FIG. 6), which is a mirror image of right side panel 140, and which is similarly attached to the left edge of the back panel. Right side panel 140 includes a rearwardly facing U-shaped channel 142 formed along the front edge thereof.

An inner panel 144 has an outer slide 146 attached thereto and has a sidewardly offset lip 148 formed along the front edge of the panel. To attach inner panel 144 to right side panel 140, lip 148 is inserted in channel 142, as indicated by the broken arrow on FIG. 6. Then, inner panel 144 is rotated about lip 148, as indicated by the solid arrow on FIG. 6 and until the rear edge (not shown) of the inner panel snaps behind the ends of tabs 130. Inner panel 144 can be easily removed by depressing tabs 130 and swinging the inner panel away from right side panel 140.

Figure 7:
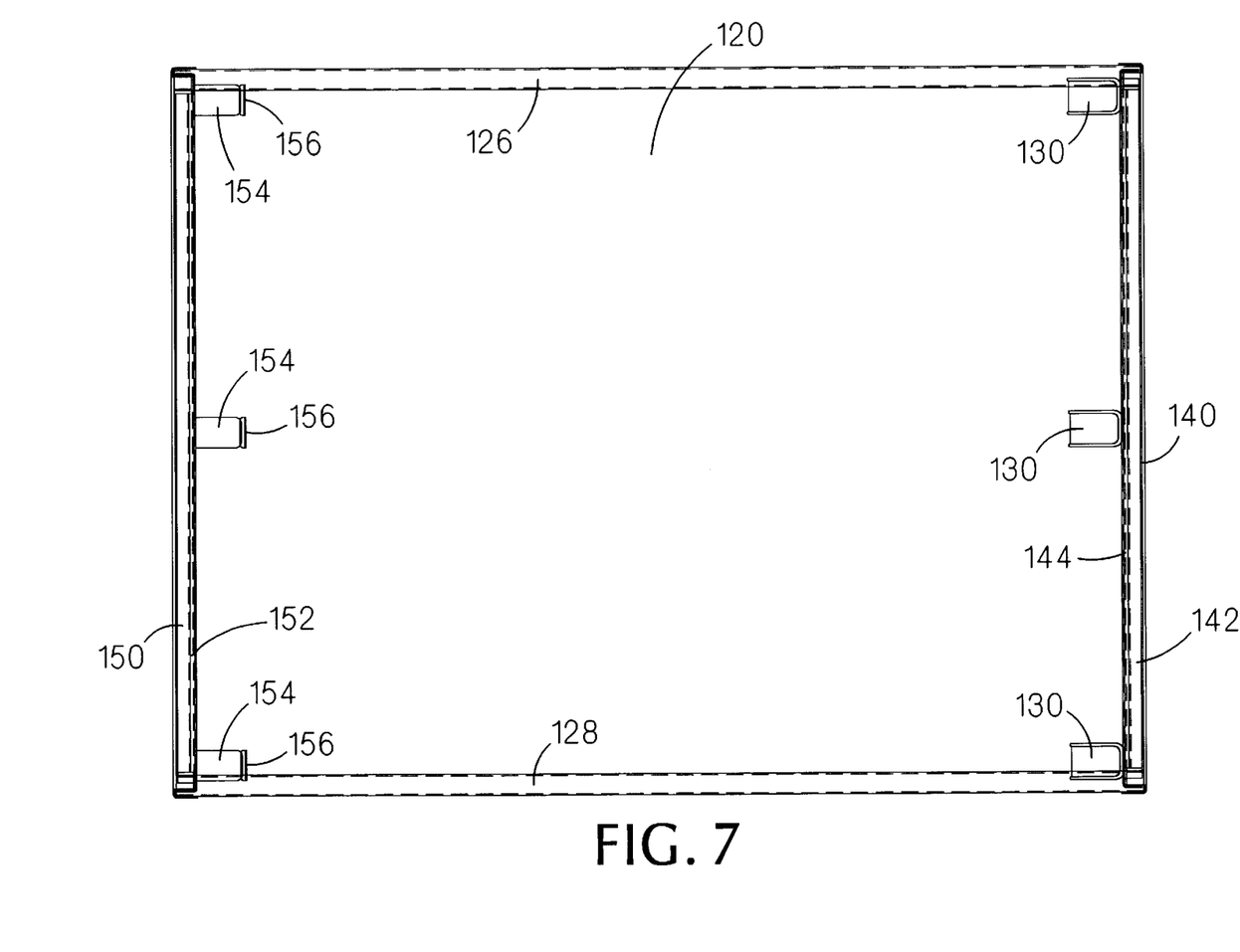
FIG. 7 is a front elevational view showing a partially completed cabinet.

FIG. 7 illustrates wrap 110 with right side panel 140 attached thereto and inner panel 144 attached to the right side panel. Also shown is a left side panel 150 attached to wrap 110 in the same manner as right side panel 140 and an inner panel 152 attached to the left side panel. The front edge of inner panel 152 is attached to left side panel 150 in the same manner as inner panel 144 is attached to right side panel 140; however, the rear of inner panel 152 is removably attached to wrap 110 by means of tabs 154 formed on inner panel 152 snapping behind tabs 156 formed on the wrap. It will be understood that to maintain wrap 100 in a symmetrical shape, only one type of attachment means will be used on both sides of the wrap. No slides are shown; however, the usual method of construction is to attach slides to inner panels before attachment of inner panels to cabinet sides.

Figure 8:
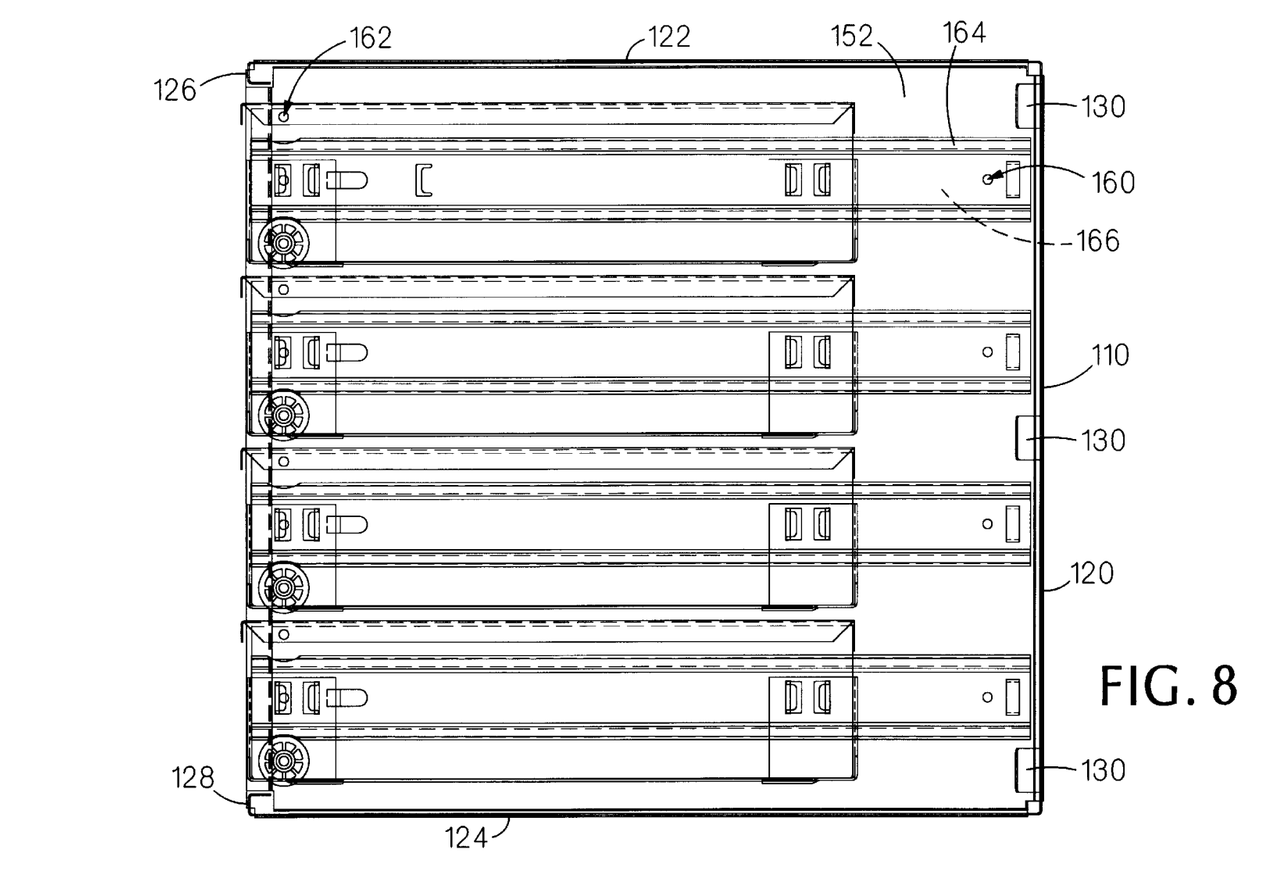
FIG. 8 is a cutaway side elevational view of the completed cabinet.

FIG. 8 illustrates that inner panels 144 and 152 are symmetrical and identical. It will be understood that, although drawers and rollers are shown which are identical to those described above, this aspect of the invention is applicable to cabinets with any type of drawers and with or without rollers. Registration holes, as at 160 are defined through the front and rear ends of the slides and through inner panel 152 to properly align the slides on the panel with a suitable fixture (not shown). When inner panel 152 is used as inner panel 144 (FIG. 6 and 7), the same registration holes 160 will be used for the same purpose; however, when rollers are used, a second set of holes, at 162, are provided in the panel for the axles of the rollers so that the panel can be used on either side of the cabinet. Outer and inner slides 164 and 166 are also symmetrical about their major axes, so that they may be used on either right or left inner side panels.

Figure 9:
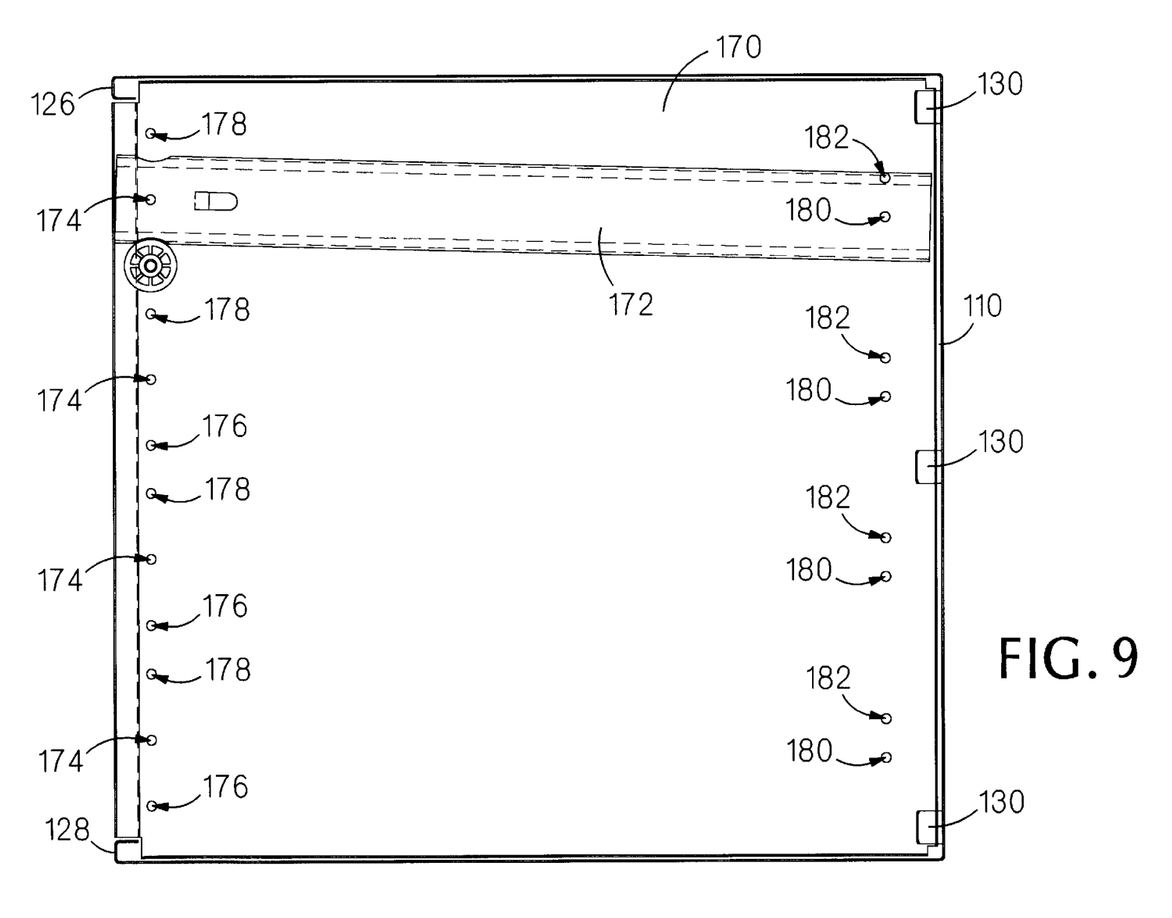
FIG. 9 is a side elevational, cross-sectional view of a partially completed cabinet.

FIG. 9 illustrates that symmetry can be provided even when inner panels are to be used with canted slides (FIG. 4). Here, a left side inner panel 170 has attached thereto a canted outer slide 172. Inner panel 170 is provided with registration holes 174 defined therethrough for locating the front ends of outer slides 172 regardless of whether the inner panel is used on the left or the right side of a cabinet. If rollers are to be used, axle holes 176 are provided for use when panel 170 is used on the left side of a cabinet and axle holes 178 are provided for use when the panel is used on the right side of a cabinet. In a similar manner, registration holes are provided for the rear end of outer slides 172 so that panel 170 can be used on either the left or the right side of a cabinet, with registration holes 180 for left side use and registration holes 182 for right side use.

In conventional cabinet construction, final painting is done after assembly. This means that sliding surfaces are painted also; however, this increases friction between the surfaces. The present invention permits the slides and inner panels to be "finished" with zinc primer which provides greatly improved sliding friction.

The snap-in feature of the inner panels provides for more economical manufacturing and permits the inner panels to be easily removed for repair or replacement. Virtually all components are "mirrored" designs, such that right and left side components are the same parts used twice and the wrap can be used right side up or upside down. Repairs at the manufacturing, distributor, or consumer level can be made via panel or shell replacement, as required. Conventional cabinets cannot be repaired or, at least, not easily repaired in most cases, resulting in discarded completed or partially completed cabinets. The decision whether to use or not to use rollers in a particular cabinet can be made near the final step in manufacture or even easily changed in the event of a mistake, making overall production control a more efficient task.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A cabinet with a sliding drawer, comprising:
   (a) a housing;
   (b) two opposing, substantially horizontally elongated, outer slides each having a vertical member attached to an inner surface of one of opposite sides of said housing and having upper and lower flange members extending inwardly and horizontally, respectively, from upper and lower edges of said vertical member;
   (c) two inner, substantially horizontally elongated slides attached to said sliding drawer and disposed in and telescopingly engaging said outer slides and extending substantially between inner surfaces of said upper and lower flange members;
   (d) two first rollers, each of said two first rollers contacting one of said inner slides and having their axes attached to said sides of said housing, with said axes of said first rollers spaced below a lower edge of said outer slide; and
   (e) two second rollers contacting said inner slides and having their axes attached to said sides of said housing, with said axes of said second rollers spaced above an upper edge of said outer slide and with said second rollers contacting said inner slides through openings defined in said upper flange members of said outer slides between front and rear ends of said upper flange members.

2. A cabinet, as defined in claim 1, wherein: said axes of said second rollers are horizontally displaced from said axes of said first rollers.

3. A cabinet, as defined in claim 1, wherein: said first rollers contact said inner slides through openings defined in said lower flange members of said outer slides between front and rear ends of said lower flange members.

* * * * *